United States Patent [19]

Arbeiter et al.

[11] Patent Number: 5,040,066
[45] Date of Patent: Aug. 13, 1991

[54] APPARATUS FOR GENERATING CONTROL SIGNALS OF A VIDEO MIXER SYSTEM

[75] Inventors: Michael Arbeiter, Darmstadt; Günter Karallus, Seeheim-Jugenheim, both of Fed. Rep. of Germany

[73] Assignee: BTS Broadcast Television Systems GmbH, Darmstadt, Fed. Rep. of Germany

[21] Appl. No.: 462,543

[22] Filed: Jan. 9, 1990

[30] Foreign Application Priority Data

Jan. 10, 1989 [DE] Fed. Rep. of Germany ....... 3900489

[51] Int. Cl.[5] .............................................. H04N 5/262
[52] U.S. Cl. .................................... 358/183; 358/22; 358/96
[58] Field of Search ................. 358/183, 22, 180, 181, 358/182, 96

[56] References Cited

U.S. PATENT DOCUMENTS

| | | | |
|---|---|---|---|
| 4,602,286 | 7/1986 | Kellar et al. .......................... | 358/183 |
| 4,812,909 | 3/1989 | Yokobayashi et al. .............. | 358/183 |
| 4,855,834 | 8/1989 | Cawley et al. ....................... | 358/183 |
| 4,862,269 | 8/1989 | Sonoda et al. ................... | 358/183 X |
| 4,918,518 | 4/1990 | Phillips ............................ | 358/183 X |
| 4,949,180 | 8/1990 | Miles .................................... | 358/183 |
| 4,954,898 | 9/1990 | Nakata ................................. | 358/183 |

Primary Examiner—Kenneth A. Wieder
Assistant Examiner—Glenn W. Brown
Attorney, Agent, or Firm—Frishauf, Holtz, Goodman & Woodward

[57] ABSTRACT

A memory for pixel factors has somewhat more than enough capacity for storing pixel factors for all the pixels of a television picture. A special effect pattern for use in fading from one input picture to another is stored in the memory either as a contour or as an area within a contour. Additional memory capacity is used for start addresses for shifting the pattern. The memory is read out line by line to provide a multiplier control signal for one video input of a mixer and a complementary multiplier control signal for another video input of a video mixer. While one set of pixel factor signals is read out from the memory it is possible to write in an increased or diminished pattern contour or area to provide special effect fading.

12 Claims, 3 Drawing Sheets

```
0 0 0 0 0 0 0 0        0 0 0 0 0 0 0 0
0 1 1 1 1 1 1 0        0 1 1 1 1 1 1 0
0 1 1 1 1 1 1 0        0 1 0 0 0 0 1 0
0 1 1 1 1 1 1 0        0 1 0 0 0 0 1 0
0 1 1 1 1 1 1 0        0 1 1 1 1 1 1 0
0 0 0 0 0 0 0 0        0 0 0 0 0 0 0 0
```

APPARATUS FOR GENERATING CONTROL SIGNALS OF A VIDEO MIXER SYSTEM

This invention concerns the generation of control signals sometimes known as factor signals, for a video mixer system. These factor signals define a special effect pattern providing a two dimensional boundary between input pictures which may vary at the picture element (pixel) rate.

Mixer systems for video signals serve to derive an output video signal from two or more input video signals. The input video signals represent different input pictures, whereas the output video signal incorporates the output picture to be transmitted or recorded. By means of mixer systems not only can different input pictures be combined into an output picture, but a fading procedure can be used for a transition from one output picture to another.

It is known to generate control or factor signals of horizontal and vertical scanning frequency to produce a so-called special effect mix or fade in which a special effect pattern which produces a small part of a new picture and expands until the new picture has superseded the previous picture. Within the surface included in the special effect pattern none of the input video signals is passed to the output of the mixer, and outside of that pattern another input video signal goes to the output. According to the time course of the horizontal frequency and vertical frequency control factor signals, various different special effect patterns can be obtained which depend not only on the horizontal frequency and vertical frequency control signals but also in the manner of correlation of these control signals. Even with the generation of relatively simple special effect patterns the control signals can already have a quite complicated time course.

SUMMARY OF THE INVENTION

It is an object of the present invention to provide apparatus for generating control signals for a video mixer system in which a substantially easy continuous shaping of special effect patterns is possible. Briefly, a read/write memory which is addressable pixel by pixel is provided for storing pixel factor signals corresponding to pixels defining a special effect pattern, and also means for reading out and processing the pixel factor signals to provide for each pixel a multiplier factor signal and a unity complement of the multiplier factor signal respectively to multipliers of the mixer system which are connected to different video input terminals.

The invention has the advantage that it is not necessary to use preprogrammed horizontal frequency and vertical frequency control signals to generate special effect patterns and, in particular, free-form and other asymmetrical special effect patterns are possible as well as the usual symmetrical patterns. No separate generation of horizontal frequency and vertical frequency control signals is necessary. The apparatus of the invention lends itself well to the use of commercially available calculating and storage component groups, and also is well suited to operate at the speeds that meets the requirements for high-definition television (HDTV).

If only sharp boundaries need to be produced, one-bit pixel factor signals can be used, but if the memory will accommodate 4-bit or 8-bit pixel factor signals, blended boundaries can be produced and even transparent inserted pictures.

The memory can conveniently have additional storage capacity beyond that which is needed for storing a complete set of pixel factor signals, since that makes it possible to store starting addresses by which a pattern can be shifted on the picture screen with little complication. The invention also has refinements for facilitating the enlarging or shrinking of special effect patterns, during a fading procedure.

BRIEF DESCRIPTION OF THE DRAWINGS

The invention is further described by way of an illustrated explanation and a description of an illustrative example, with reference to the annexed drawings, in which.

The same parts are designated with the same reference numerals in the several figures.

EXPLANATION AND DESCRIPTION OF THE ILLUSTRATED EMBODIMENT

Figures 1, 2A, 2B:
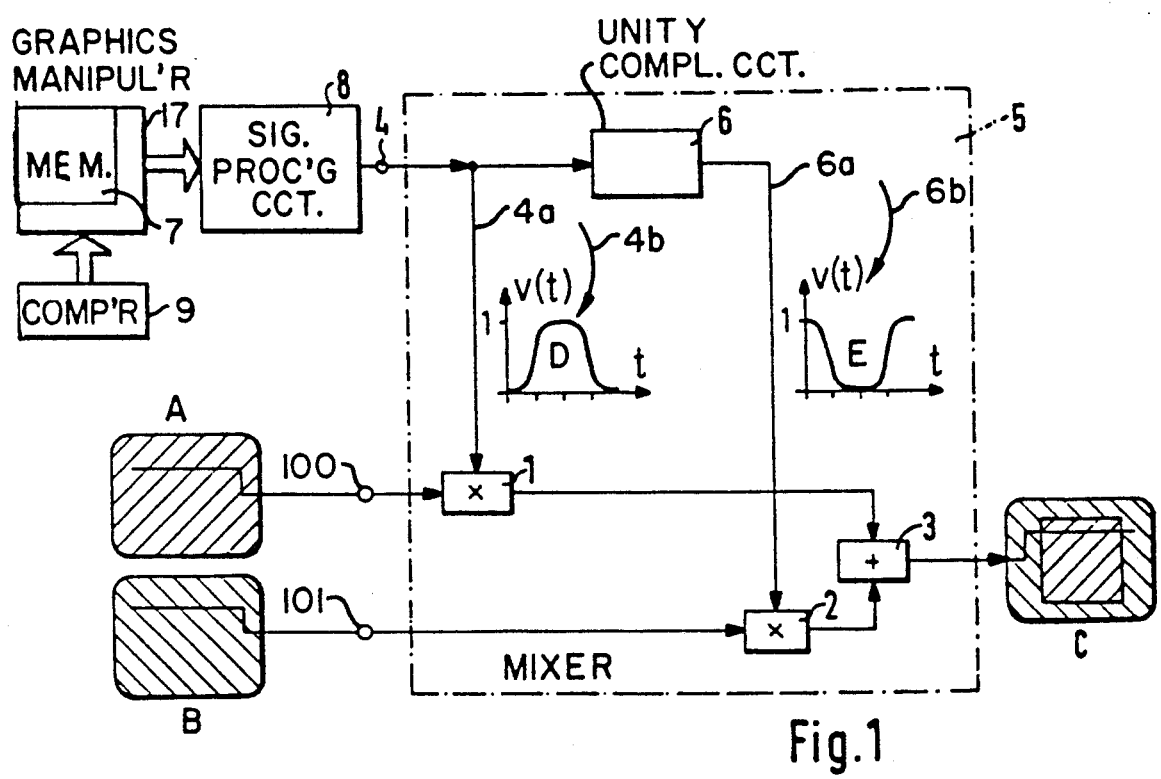
FIG. 1 is a drastically simplified block circuit diagram representing of a video mixer system according to the invention.
FIG. 2a and 2b are respective schematic tabular representations of the loading of a memory for two different embodiments of the invention.

FIG. 1 is a simplified schematic representation of a video mixer having a system according to the invention for generating the control signals for the mixer. Input pictures A and B are distinguished from each other by different diagonal shading representing their different picture content, so that the portions of the output picture C derived from the input pictures can be recognized.

The video signals respectively corresponding to the input pictures A and B are passed through respective multipliers 1 and 2 and then supplied to the respective inputs of an addition circuit 3, at the output of which the output video signal is made available. Mutually complementary control signals, the sum of which is always equal to 1, are respectively supplied to the multipliers 1 and 2. One of these control signals is supplied through an input 4 to the mixer 5, wherein it proceeds by the conductor 4a to the control input of the multiplier 1, while it is also supplied to a circuit 6 which produces its unity complement for delivery over the conductor 6a to the control input of the multiplier 2. The arrows 4b and 6b point to timing diagrams D and E illustrating the course of the control signals as they might be during a television line or some other picture portion.

In a manner which corresponds to the control signals, the output picture C is composed of an inner rectangular portion having some content of the input picture A and a remainder portion having some content of the input picture B. The transition from one picture to the other can take place in a known way either with a sharp line boundary or else with a gradual transition for fading in picture A while fading out picture B. The rectangle may be enlarged, for example, beginning with a small area in the middle of the picture until the picture A takes over the entire picture format. The rectangle just described is generally referred to as a special effect pattern and of course many different patterns and methods for expanding or skrinking them are usable for such special effect transitions.

The special effect pattern to be used in the system of FIG. 1 is stored in a digital read-write memory 7 and is read out from this digital memory line by line in order to generate the control signals. The signals read out of the memory 7 are processed in a signal processing circuit 8 where they are converted from digital to analog form and subjected to further processing steps which will be explained below. A computer 9 continuously calculates a special effect pattern with changing size during every fading operation from one picture to another. The digital memory 7 has a storage location corresponding to every picture element (pixel), which means 1048×1440 for a high definition television (HDTV) system. According to the particular kind of embodiment a storage location can be provided for a single place or multiplace binary number relating to each pixel. The value stored in each case in a single storage location signifies in what proportion the output picture is composed of the respective input pictures and, more particularly, by which factor the particular pixel of an input picture is to be multiplied.

For this reason these values are referred to as pixel factors in what follows.

With only 1 bit quantization there is only a choice between all of one pixel and all of another for the output picture, providing sharp edges between pixels of different input pictures. With quantization of higher resolution, for example 4 or 8 bits, transitions in both senses can be stored in the memory. Even a transparent representation is thereby possible. More storage capacity is then needed, however. With quantization of the stored control signals with one bit per pixel it still remains possible to provide edges that are not sharp if subsequent processing in the signal processing circuit 8 includes two-dimensional filtering of the control signals that are read out.

Two embodiments of the system of the invention will now be explained with reference to FIG. 2a and 2b in which different signals are deposited in the memory 7 of FIG. 1. For purposes of convenient illustration, only an 8×6 array of pixel factors is shown instead of the numerous pixel factors that must actually be stored. In this drastically reduced pixel factor array it is still possible to store a rectangular special effect pattern.

In the embodiment according to FIG. 2a the special effect pattern is entered as an area, which signifies that those pixel factors for which a 1 is entered in the memory select values from a particular one of the two input video signals, whereas the pixel factors for which a 0 is entered in the memory select values from the other input video signal. In the embodiment of FIG. 2b only the contour of the special effect pattern is entered in the memory. Since, however, in the output picture no input picture is shown merely as an empty boundary, but is shown as a full surface, in the second embodiment the contour stored in the memory is filled out in the signal processing circuit 8 of FIG. 1. This can take place, for example, when the fourth or fifth line of the memory content of FIG. 2b is read out, and at the same time the storage locations between the contour of the previous line are written in with ones. Further differences between the two embodiments are explained below with reference to FIG. 5.

Figure 3:
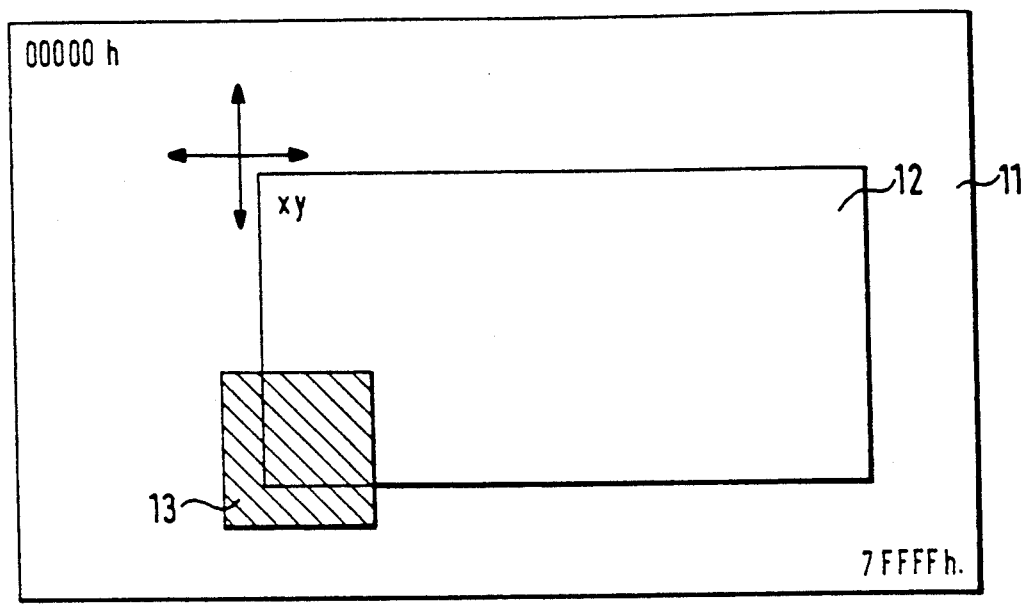
FIG. 3 is a schematic representation for explaining a method of shifting a special effect pattern on a television screen.

FIG. 3 shows a method for shifting a special effect pattern in the video mixer system of the invention. For this purpose a memory with more storage locations is provided than is made necessary for the pixels of a picture. The overall address space of this memory is represented in FIG. 3 as a rectangle 11. For a capacity of 1 Mbytes the addresses run, for example from 00000h to 7FFFFh. Beginning with an address x,y as the output start address the portion 12 of the memory can be read out line by line in accordance with the television standard. This output window includes the number of storage locations needed for a picture. The special effect pattern 13 is written into the memory. The pixel factors are read out to the extent that they fall in the output window. By choice of the output start address x, y, of the window 12, the position of the special effect pattern can be fixed within the output window. By changing the output start address x, y the shift of the special effect pattern is produced. By this method the computer is not burdened with the task of continuously repeating the calculation of the pixel factors belonging to the special effect pattern.

Figure 4:
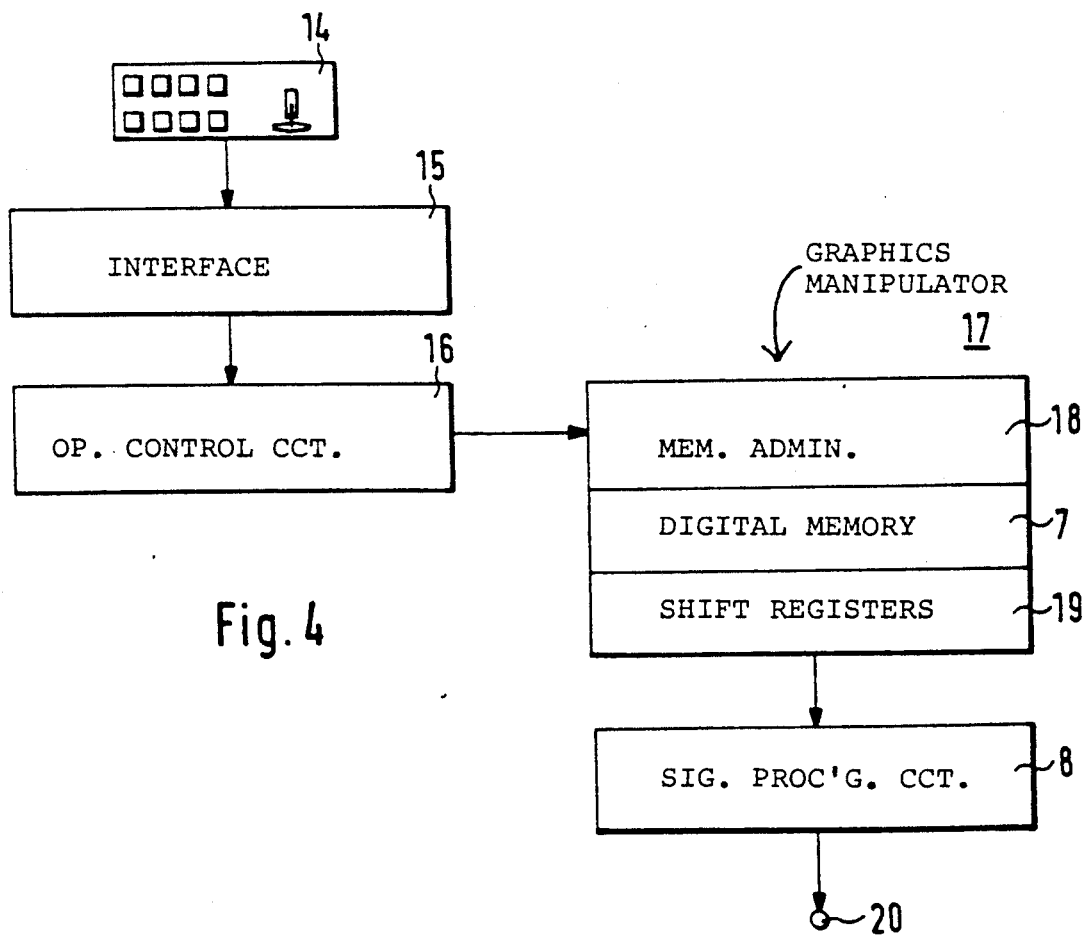
FIG. 4 is a block diagram illustrating the functional subdivisions a video mixer system of the invention.

FIG. 4 shows a block circuit diagram of the mixer system according to the invention. The necessary commands can be entered in a keyboard 14, whereby the corresponding signals are led by a connection circuit or interface 15 to the operation control circuit 16. The operation control circuit 16 in turn controls a graphics manipulator 17 which represents the core portion of the system of the invention. A memory administrator 18 of the graphics manipulator 17 administers the memory 7 in which the abstract special effect patterns are stored for a special effect fading process and are also processed or modified. The graphics manipulator 17 can enter basic component parts of special effect patterns in the memory 7. These are, for example, the side lines of a rectangular surface when a rectangular surface is to be defined by the respective enclosing side lines.

The graphics manipulator finds, by interpolation if necessary, the pixels which are necessary for the representation of the particular side lines that are desired and stores the pixel factors under the corresponding addressing in the memory 7. The graphics manipulator contains, in addition to the memory 7, shift registers 19, by which the pixel factors read out from the memory 7, can be intermediately stored and read out in serial fashion as control signals. The digital data stream read out from the shift registers is converted from digital to analog form in the signal processing circuit 8 and is then filtered. The control signal then is available at the output 20. Optionally digital processing may to be used after read out, in which case such digital processing takes place before the digital to analog conversion.

The operation control circuit 16 which controls the graphics manipulator 17 transmits repeated commands to the graphics manipulator 17, these commands being designated as basic graphics commands in what follows. Thus, for example a basic graphics command may require that the contours of a rectangle should be generated with growing rectangle size. In the memory there is then produced a progressively increasing rectangular surface by which the operation of a special effect fading transition from one picture to another is possible. For that purpose corresponding control signals are supplied from a keyboard 14 through a connection circuit or interface 15. In a practical embodiment the system of the connection circuit or interface 15 consists of a computer with a microprocessor of type 8031, while the operation control circuit consists of a microprocessor of type 80186. The graphics manipulator 17 can advantageously be constructed with a set of integrated circuits available for computer graphics from the Hitachi firm. In such a practical embodiment the memory is of 1M byte size and the pixel factors are each quantized in 4 bits. The pixel factors of a picture of high definition television (HDTV) system occupy a storage capacity of 750 k bytes. The remainder of the memory is utilized for the pattern shifting method explained in connection with FIG. 3.

Figure 5:
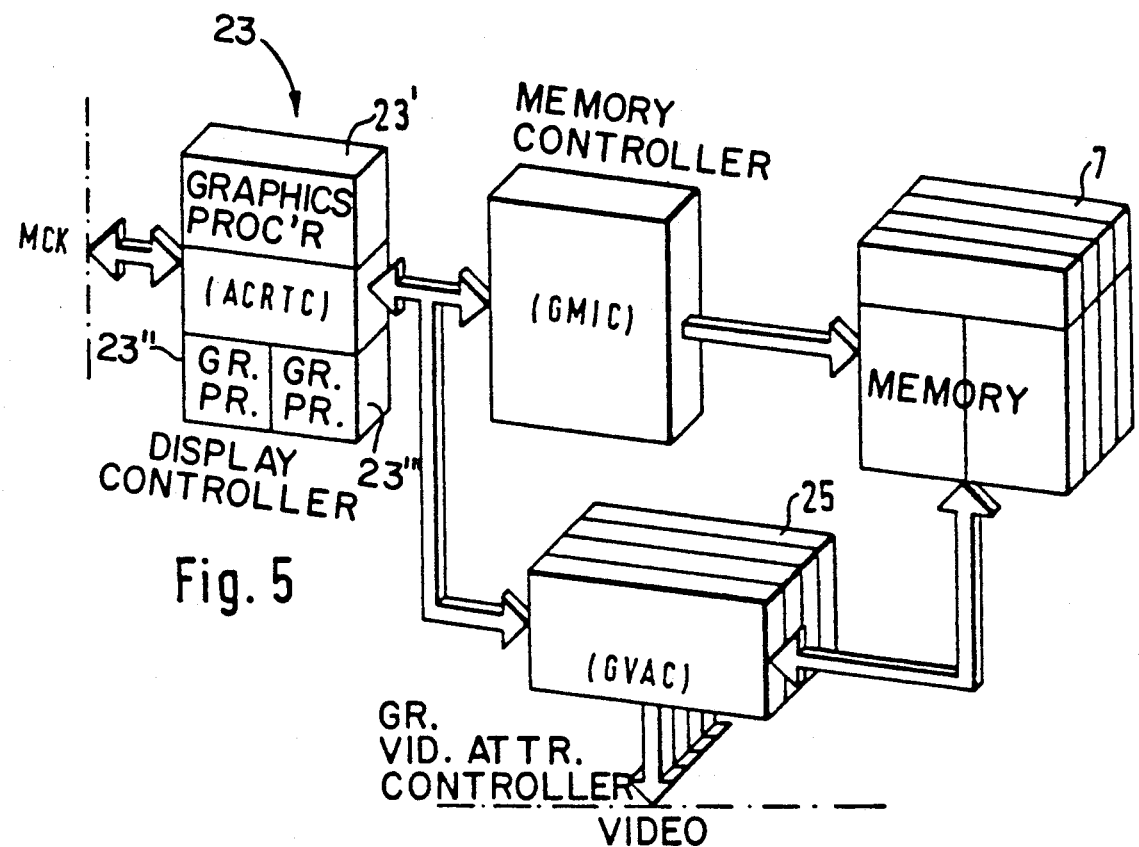
FIG. 5 is a basic block circuit diagram of an embodiment of the video mixer system of the invention constructed of computing and memory components available commercially.

FIG. 5 shows a 3 dimensional block circuit diagram of the graphics manipulator 17 of FIG. 4 which consists of three circuit groups 23, 24 and 25 as well as the picture memory 7. The integrated circuit 23 represents a so-called advance cathode ray tube (display) controller (ACRTC) and includes three graphics processors. The first processor 23' carries out the pixel calculation i.e. it defines, in the case of the provision of a command such as "circle with radius r", which pixels are necessary for outlining the circle. For that purpose it interpolates in two dimensions. A second processor 23", the so-called display processor, carries out the line by line writing-in of the two dimensionally interpolated circle into the picture memory and administers the memory with respect to updating (refreshing) and subdivision. The third processor 23''', the so-called timing processor, generates in a parametrifiable form all the signals necessary for time interval subdivision in accord with a television standard. For example output signals may be produced for determining the active picture duration while the picture memory is not changed at the locations that may have been just read out.

The intergrated circuit 24 serves for controlling the memory 7 and is called a graphic memory interface controller (GMIC). With it addresses and various pulses for operating the memory are generated. The circuit group 25 consists of 4 integrated circuits and forms a graphic video attribute controller (GVAC), which serves on the one hand for data transfer between the graphics processors of the controller 23 and the memory 7 and on the other hand for parallel to serial conversion of the control signals that are read out. In this connection it should be noted that on the one hand the pixel factors calculated by the a processor of the controller 23, which represent the special effect pattern, occur irregularly with reference to the line by line scanning of the television picture. On the other hand the control signals are a kind of video signals, which must be synchronous with the television scan. The data are therefore read out from the memory 7 in packets, are then stored intermediately in the circuits of the GVAC 25 and finally read out continuously from the circuit 25. Between the individual data packets the newly calculated pixel factors are written into the memory, after which they are likewise stored temporarily in the circuits of the GVAC 25. As the result of access to the memory 7 for write-in during the pauses between the packet-wise read-outs, the capacity provided in a unit of practical dimensions for a picture is within itself sufficient for including the capacity which is necessary for shifting the special effect pattern (FIG. 3). In this connection there is nevertheless a problem in connection with the storage of the contour of the special effect pattern of FIG. 2b. In a fading operation the graphics processors cannot completely calculate the new contour from one picture scan to the next. This does not disturb the overall surface of the special effect pattern at the time of storage, since the neighboring pixel factors are still stored. As a result only very slight inaccuracies arise within the order of magnitude of a pixel. In the case of storing of the contour, however, in the case of a fading operation which proceeds too rapidly for the graphics processors, although a closed contour is generated promptly, the signal processing circuit 8 is not in a position to fill out the contour. It is therefore provided that in the embodiment corresponding to FIG. 2b, two memories 7 are provided, of which one is written into with the new special effect pattern, while the previous special effect pattern read out from the other.

Figure 6:
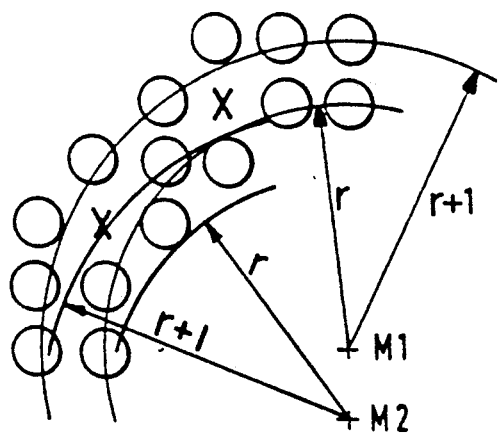
FIG. 6 is a diagram for explaining the generation of a special effect pattern having the shape of a circular disc.

FIG. 6 shows, in part, two circles, as they are calculated in order to permit a circular disc-shaped special effect pattern to be gradually enlarged. On the basis of the radii $r$ and $r+1$, the pixel factors for the pixel elements represented as small circles in FIG. 6 are calculated. In this operation the error locations designated with X arise on account of quantization errors. According to a further development of the mixer system of the invention, this disadvantage is avoided by twice calculating each of the circles with the same radius. When the second calculation is done, the midpoint M2 is shifted by one line in the vertical direction with respect to M1.

Although the invention has been described with reference to particular illustrative examples, it will be understood that variations and modifications are possible within the inventive concept.

We claim:

1. Apparatus for generating control signals for a video mixer system, wherein said control signals, known as factor signals, define a special effect pattern providing a two-dimensional boundary between input pictures which may vary at the picture element rate, comprising:

a read/write digital memory (7) addressable in line and pixel-in-line coordinates for storing pixel factor signals corresponding to pixels defining a special effect pattern;

means for storing pixel factor signals in said memory having a first value at locations corresponding to pixels within a said special effect pattern and pixel factor signals having a second value at locations corresponding to pixels outside of said special effect pattern, whereby said special effect pattern is an area enclosed by a continuous boundary;

means for storing in said memory pixel factor signals having a first value at locations defining a closed contour boundary line of a said special effect pattern and for storing pixel factor signals having a second value in locations corresponding to all other pixels; and means for reading out said pixel factor signals, converting them to analog form, filtering them and deriving inverse filtered pixel factor signals therefrom and thereby providing, to first and second multipliers of said mixer connected to first and second video input terminals, respectively for each pixel, a multiplier factor signal and a unity complement of said multiplier factor signal.

2. The apparatus of claim 1, wherein said pixel factor read-out means include means for reading out said pixel factor signals line by line from said memory and also means for modifying the special effect pattern by writing into one memory portion pixel factor signals for a modified special effect pattern and simultaneously reading out of another memory portion previously stored pixel factor signals during a fading operation.

3. The apparatus of claim 1, wherein said pixel factor read-out means includes intermediate storage means for pixel factor signals read out from said memory, means for reading said pixel factor signals in packets out of said memory and for writing them in packets into said intermediate storage means, and also means for writing new pixel factor signals for the next special effect pattern into said memory between transfers of said packets of pixel factor signals.

4. The apparatus of claim 3, wherein said intermediate storage means is composed of shift registers (19).

5. The apparatus of claim 4, wherein said intermediate storage means composed of shift registers has an output connected to an input of a signal processing circuit (8) which contains a digital to analog converter and an analog filter.

6. The apparatus of claim 1, wherein said memory (7) is incorporated in a graphics manipulator unit (17) in which there are provided a graphic memory interface controller (24), a display controller (23) having a plurality of graphic processors, a graphic video attribute controller (25) and a bus system for interconnecting said memory, said graphic memory interface controller, said display controller (23) and said graphic video attribute controller (25).

7. The apparatus of claim 1, wherein said memory provides storage for a single bit for each pixel factor signal.

8. The apparatus of claim 1, wherein said memory provides storage for 4 bits for each pixel factor signal.

9. The apparatus of claim 5, wherein means are provided in said signal processing circuit (8) for filling the pixel locations enclosed by said contour by pixel factors corresponding to the pixel factors of said contour.

10. The apparatus of claim 5, wherein said signal processing circuit (8) includes a two-dimensional filter.

11. The apparatus of claim 1, wherein means are provided for generating pixel factor signals of a special effect pattern in the shape of a circular disc by calculating pixel locations for two circles having the same radius, one of said circles having a center vertically shifted from the center of the other by one line.

12. The apparatus of claim 1, wherein said memory contains more storage locations than are necessary for the pixel factors for all of the pixels of a television picture and wherein means are provided for shifting a special effect pattern stored in said memory by altering the start address of a portion of said memory which is about to be read out.

* * * * *